US012608646B2

(12) United States Patent
Lin et al.

(10) Patent No.: US 12,608,646 B2
(45) Date of Patent: Apr. 21, 2026

(54) FEATURE SELECTION METHOD

(71) Applicants: Acer Incorporated, New Taipei City (TW); Acer Medical Inc., New Taipei City (TW); Chang Gung Memorial Hospital, Keelung, Keelung City (TW); National Health Research Institutes, Miaoli County (TW)

(72) Inventors: Yi-Chun Lin, New Taipei City (TW); Yin-Hsong Hsu, New Taipei City (TW); Tsung-Hsien Tsai, New Taipei City (TW); Yun-Hsuan Chan, New Taipei City (TW); Ting-Fen Tsai, Miaoli County (TW); Wei-Che Hsu, Miaoli County (TW); Chi-Hsiao Yeh, Keelung City (TW)

(73) Assignees: Acer Incorporated, New Taipei City (TW); Acer Medical Inc., New Taipei City (TW); Chang Gung Memorial Hospital, Keelung, Keelung City (TW); National Health Research Institutes, Miaoli County (TW)

( * ) Notice: Subject to any disclaimer, the term of this patent is extended or adjusted under 35 U.S.C. 154(b) by 935 days.

(21) Appl. No.: 17/751,689

(22) Filed: May 24, 2022

(65) Prior Publication Data

US 2023/0259814 A1 Aug. 17, 2023

(30) Foreign Application Priority Data

Feb. 14, 2022 (TW) .................................. 111105254

(51) Int. Cl.
*G06N 20/00* (2019.01)

(52) U.S. Cl.
CPC .................................... *G06N 20/00* (2019.01)

(58) Field of Classification Search
None
See application file for complete search history.

(56) References Cited

U.S. PATENT DOCUMENTS

| | | | | |
|---|---|---|---|---|
| 2007/0127825 A1* | 6/2007 | Ivanov | .................. | G06F 18/254 |
| | | | | 382/228 |
| 2010/0036782 A1* | 2/2010 | Zhao | ...................... | G06N 3/126 |
| | | | | 706/13 |

(Continued)

FOREIGN PATENT DOCUMENTS

| | | |
|---|---|---|
| CN | 101061510 | 9/2010 |
| CN | 111629663 | 9/2020 |

(Continued)

OTHER PUBLICATIONS

Saeys, Yvan, Thomas Abeel, and Yves Van de Peer. "Robust feature selection using ensemble feature selection techniques." In Machine Learning and Knowledge Discovery in Databases: European Conference, Ecml Pkdd 2008, Antwerp, Belgium, Sep. 15-19, 2008, Proceedings, Part II 19, pp. 313-325. 2008. (Year: 2008).*

(Continued)

*Primary Examiner* — Vincent Gonzales
(74) *Attorney, Agent, or Firm* — JCIPRNET

(57) ABSTRACT

A feature selection method is provided, including: inputting a plurality of pieces of training data into a plurality of training models to perform selection in a plurality of features through each training model for obtaining multiple feature pools; sorting the features based on the number of times each feature is selected by the feature pools to obtain a feature ranking; and extracting a plurality of designated features from the features based on the feature ranking.

8 Claims, 6 Drawing Sheets

(56) References Cited

U.S. PATENT DOCUMENTS

2016/0174902 A1    6/2016  Georgescu et al.
2020/0411193 A1*  12/2020  Wald ........................ G06N 5/01

FOREIGN PATENT DOCUMENTS

CN          113435602          9/2021
TW          202020887          6/2020

OTHER PUBLICATIONS

Tsai, Chih-Fong, and Yu-Chieh Hsiao. "Combining multiple feature selection methods for stock prediction: Union, intersection, and multi-intersection approaches." Decision support systems 50, No. 1 (2010): 258-269. (Year: 2010).*

James G, Witten D, Hastie T, Tibshirani R. An introduction to statistical learning. New York: springer; Jun. 2013, corrected 8th printing 2017. 441 pages. (Year: 2017).*

Weng, Cheng-Hsiung, Tony Cheng-Kui Huang, and Ruo-Ping Han. "Disease prediction with different types of neural network classifiers." Telematics and Informatics 33.2 (2016): 277-292. (Year: 2016).*

S. Russell and P. Norvig, Artificial Intelligence: A Modern Approach, 2nd Ed., 2003, chapt 18-21, pp. 649-789. (Year: 2003).*

Nicola Lazzarini et al., "RGIFE: a ranked guided iterative feature elimination heuristic for the identification of biomarkers," BMC Bioinformatics, Jun. 2017, pp. 1-22.

Yajie Meng et al., "HFS-SLPEE: A Novel Hierarchical Feature Selection and Second Learning Probability Error Ensemble Model for Precision Cancer Diagnosis," Frontiers in Cell and Developmental Biology, vol. 9, Jun. 2021, pp. 1-13.

Xin Huang et al., "A Novel Method for Constructing Classification Models by Combining Different Biomarker Patterns," IEEE/ACM Transactions on Computational Biology and Bioinformatics, vol. 19, Mar./Apr. 2022, pp. 786-794.

Maurizio Giordano et al., "Ensemble of rankers for efficient gene signature extraction in smoke exposure classification", BMC Bioinformatics, Mar. 8, 2018, pp. 41-54, vol. 19, No. 2.

Thomas Abeel et al., "Robust biomarker identification for cancer diagnosis with ensemble feature selection methods", Bioinformatics, Feb. 1, 2010, pp. 392-398, vol. 26, No. 3.

* cited by examiner

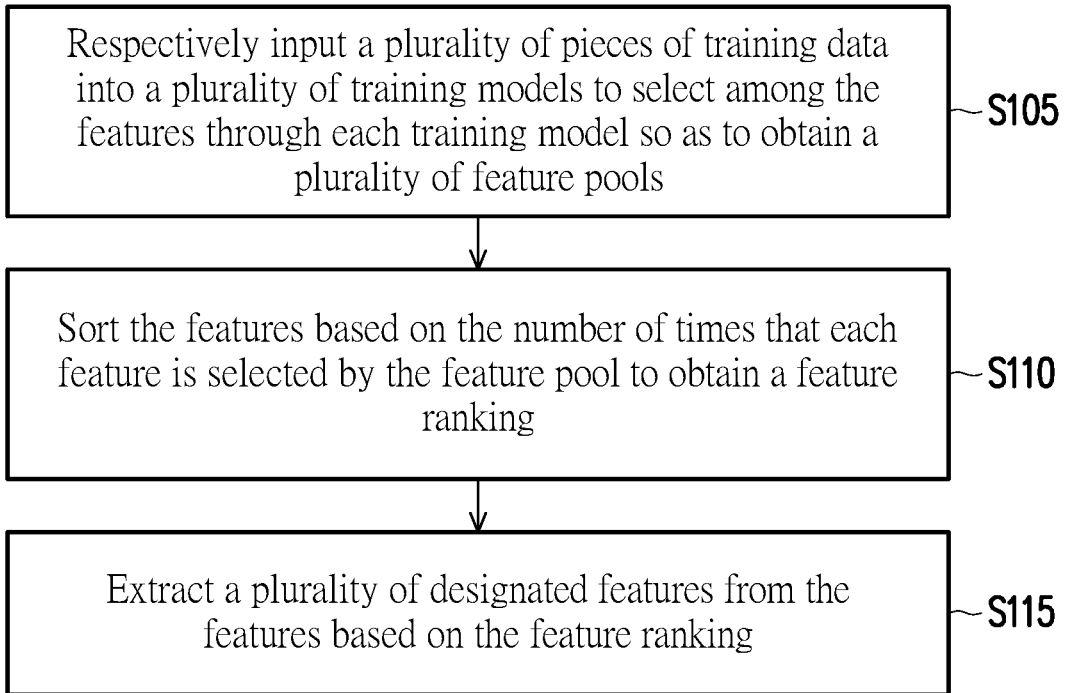

Respectively input a plurality of pieces of training data into a plurality of training models to select among the features through each training model so as to obtain a plurality of feature pools ~S105

Sort the features based on the number of times that each feature is selected by the feature pool to obtain a feature ranking ~S110

Extract a plurality of designated features from the features based on the feature ranking ~S115

| Selection method (1): for a single feature | Selection method (2): for all features | Selection method (3): for a feature type |

Obtain an integrated feature pool — S610

Select the representative features from the integrated feature pool — S615

Select the final feature from the representative features — S620

FEATURE SELECTION METHOD

CROSS-REFERENCE TO RELATED APPLICATION

This application claims the priority benefit of Taiwan application serial no. 111105254, filed on Feb. 14, 2022. The entirety of the above-mentioned patent application is hereby incorporated by reference herein and made a part of this specification.

BACKGROUND

Technical Field

The disclosure relates to a model construction method, and particularly relates to a feature selection method.

Description of Related Art

During a doctor's consultation in the hospital, the doctor usually obtains physiological information from the patient's blood and uses it as an indicator to assist in diagnosing diseases. Physiological information that can be obtained from blood may include omics features such as metabolites and genes. Most of the conventional technologies only consider one single type of omics data and use methods such as machine learning for feature selection. When a variety of omics data is taken into consideration at the same time, all the omics data is added together and then methods such as machine learning are used for feature selection. However, the number of omics features can range from as few as a hundred to tens of thousands. If all the omics features are selected, it will take a lot of time and resources even with machine learning.

SUMMARY

The disclosure provides a feature selection method for effectively selecting the most influential feature.

A feature selection method according to the disclosure selects among a plurality of features by using an electronic device. The feature selection method includes: inputting a plurality of pieces of training data into a plurality of training models respectively to select among the features through each of the training models to obtain a plurality of feature pools; sorting the features based on the number of times that each of the features is selected by the feature pools to obtain a feature ranking; and extracting a plurality of designated features from the features based on the feature ranking.

In an embodiment of the disclosure, the step of selecting among the features through each of the training models to obtain the feature pools includes at least one of the following three selection methods: (1) calculating at least one statistical index for a single feature through each of the training models one by one, and comparing the statistical index with a corresponding critical value to determine whether to select each of the features to the corresponding feature pool; (2) performing a feature extraction operation on the features through each of the training models to obtain the feature pools respectively corresponding to the training models; and (3) classifying the features into a plurality of feature groups based on a plurality of feature types, so that each of the training models performs the feature extraction operation on the features included in each of the feature groups to obtain, for each of the training models, the feature pools respectively corresponding to the feature groups.

In an embodiment of the disclosure, in the selection method (3), the feature selection method includes: setting the feature pools corresponding to each of the feature groups as a feature set; sorting the features in each feature set based on the number of times that each feature is selected by the feature pools to obtain the feature ranking of each feature set; and extracting a corresponding number of designated features from each feature set based on a weight corresponding to each of the feature groups and the feature ranking. The weight corresponding to each of the feature groups is based on a ratio of the number of features included in each of the feature groups to the number of all features.

In an embodiment of the disclosure, under a condition of selecting multiple selection methods from the three selection methods, the feature selection method further includes: obtaining the designated features that meet a corresponding specified number for each of the multiple selection methods to respectively obtain a plurality of selected feature groups corresponding to the multiple selection methods.

In an embodiment of the disclosure, after respectively obtaining the selected feature groups corresponding to the multiple selection methods, one of a union, an intersection, and a difference is executed on the selected feature groups to obtain an integrated feature pool.

In an embodiment of the disclosure, after obtaining the integrated feature pool, a plurality of known databases are queried through a multiomics feature regulation pathway analysis to select one or more representative features in the integrated feature pool.

In an embodiment of the disclosure, after obtaining the one or more representative features, a plurality of pieces of test data are used to obtain a plurality of accuracy rates of each of the training models under a condition of respectively selecting the representative features of a plurality of different feature numbers; and one or more final features are selected from the representative features based on the accuracy rates.

In an embodiment of the disclosure, the step of extracting the designated features from the features based on the feature ranking includes: extracting the designated features that meet a specified number from the features based on the feature ranking. After obtaining the feature pools, a plurality of pieces of test data are used to obtain a plurality of accuracy rates of each of the training models under a condition of selecting features of a plurality of different feature numbers; one of the training models based on the accuracy rates is selected; a steep slope map is obtained based on the feature numbers and the accuracy rates of the selected one of the training models; and the specified number is obtained from the feature numbers based on the steep slope map.

In an embodiment of the disclosure, after obtaining the designated features, a plurality of known databases are queried through a multiomics feature regulation pathway analysis to select one or more representative features from the designated features.

In an embodiment of the disclosure, after obtaining the representative features, a plurality of pieces of test data are used to obtain a plurality of accuracy rates of each of the training models under a condition of respectively selecting the representative features of a plurality of different feature numbers; and one or more final features are selected from the representative features based on the accuracy rates.

A feature selection method according to the disclosure selects among a plurality of features by using an electronic device. The feature selection method includes: inputting a plurality of pieces of training data into a plurality of training models respectively by one of the following three selection methods to select among the features through each of the training models to obtain a plurality of designated features. The selection methods include: (1) calculating a statistical index for a single feature through each of the training models one by one, and comparing the statistical index with a corresponding critical value to obtain the designated features from the features; (2) performing a feature extraction operation on the features through each of the training models to obtain a plurality of feature pools respectively corresponding to the training models, sorting the features based on the number of times that each of the features is selected by the feature pools to obtain a feature ranking, and extracting the designated features from the features based on the feature ranking; and (3) classifying the features into a plurality of feature groups based on a plurality of feature types, so that each of the training models performs the feature extraction operation on the features included in each of the feature groups to obtain, for each of the training models, the feature pools respectively corresponding to the feature groups, sorting the features based on the number of times that each of the features is selected by the feature pools to obtain a feature ranking, and extracting the designated features from the features based on the feature ranking.

Based on the above, the disclosure uses multiple training models to select the features, and then performs the next selection according to the number of times that each feature is selected by the training model. Accordingly, through the multi-level feature selection, the disclosure not only saves time in feature selection but also selects the most influential feature while maintaining high accuracy rates.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 1 is a flowchart of a feature selection method according to an embodiment of the disclosure.

DETAILED DESCRIPTION OF DISCLOSED EMBODIMENTS

Figure 2:
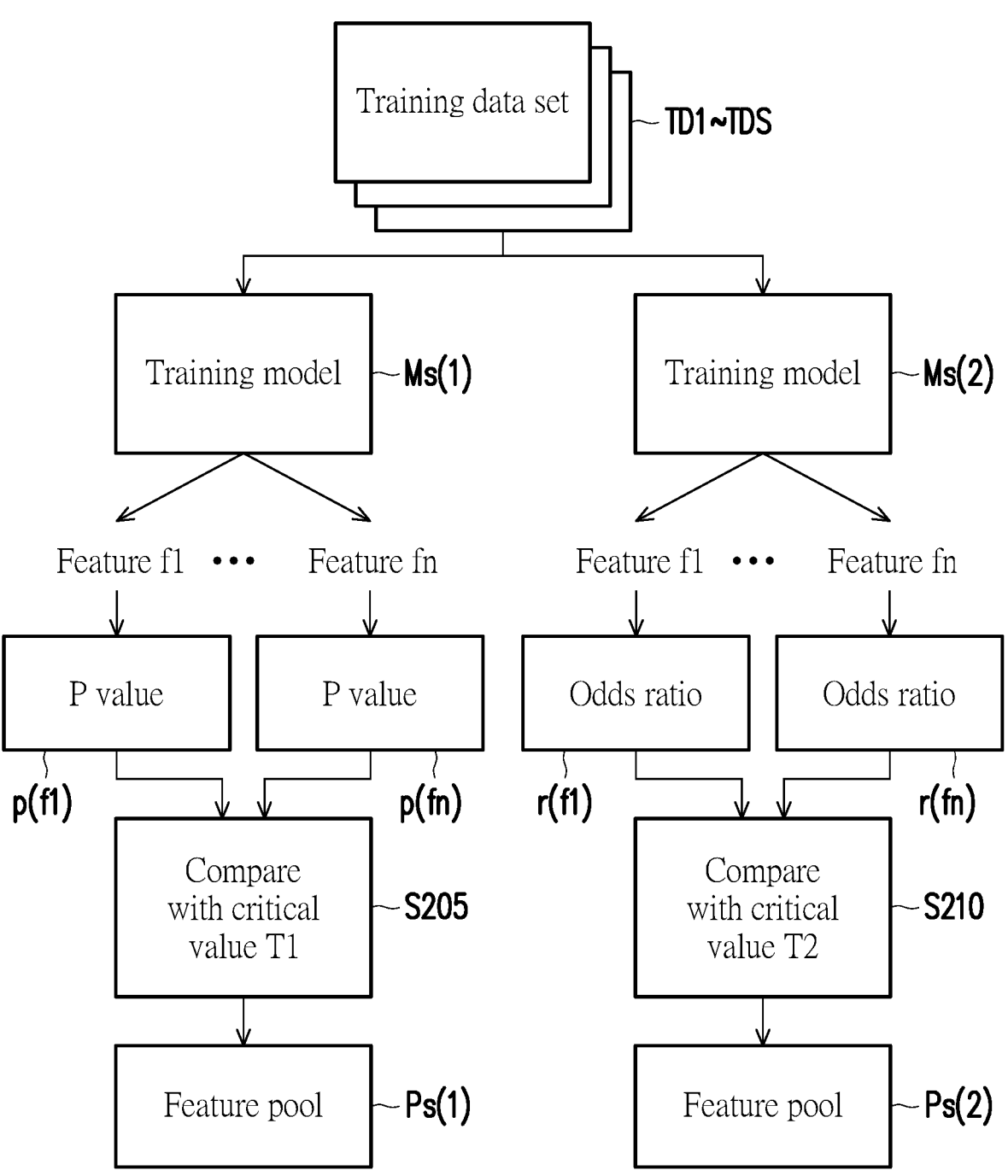
FIG. 2 is a schematic diagram of a selection method for a single feature according to an embodiment of the disclosure.

Generally speaking, the physiological information that can be obtained from blood may include omics features such as metabolites and genes. If multiple types of omics information can be taken into consideration at the same time to assist in the analysis from different information aspects, it will be of great help for clinical applications and can not only improve the accuracy but also assist in the prediction of diseases (such as diabetes and kidney disease). In addition, if the physiological state can be interpreted and judged with the least omics features, the judgment efficiency will be improved. Therefore, the disclosure provides a feature selection method that achieves high efficiency, high accuracy, and high applicability, as will be described hereinafter. The following embodiment is implemented by an electronic device with a computing function. For example, the following embodiment may be implemented by an electronic device such as a server, a personal computer, a notebook computer, a tablet computer, and even a smart phone.

The electronic device includes a processor, a storage element, and a communication element. The processor is, for example, a central processing unit (CPU), a physics processing unit (PPU), a programmable microprocessor, an embedded control chip, a digital signal processor (DSP), an application specific integrated circuit (ASIC), or other similar devices.

The storage element is, for example, any type of fixed or removable random access memory (RAM), a read-only memory (ROM), a flash memory, a hard disk, other similar devices, or a combination of these devices. One or more code fragments are stored in the storage element. After being installed, the code fragments are executed by the processor to implement the following feature selection method.

The communication element may be a chip or circuit using a local area network (LAN) technology, a wireless LAN (WLAN) technology, or a mobile communication technology. The local area network is, for example, Ethernet. The wireless local area network is, for example, Wi-Fi. The mobile communication technology is, for example, Global System for Mobile Communications (GSM), the third generation mobile communication technology (3G), the fourth generation mobile communication technology (4G), the fifth generation mobile communication technology (5G), and so on.

FIG. 1 is a flowchart of the feature selection method according to an embodiment of the disclosure. Referring to FIG. 1, in step S105, a plurality of pieces of training data are respectively input into a plurality of training models to select among the features through each training model so as to obtain a plurality of feature pools. The training model may be implemented by using a plurality of different statistical models or a plurality of different machine learning models. For example, the statistical model may use, for example, a least absolute shrinkage and selection operator (Lasso) algorithm, a stepwise logistic regression method, a statistical test method, etc. The machine learning model uses, for example, a random forest algorithm, a support vector machine (SVM) algorithm, etc.

In an embodiment, a plurality of training data sets may be divided based on the training data, and these training data sets may be input into each training model for training one by one for the training model to select features with the strongest correlation. Here, according to different selection methods selected, one feature pool may be obtained by one training model, or a plurality of feature pools may be obtained by one training model.

In this embodiment, at least one of the following three selection methods (1) to (3) may be selected. Selection method (1): at least one statistical index is calculated for a single feature through each training model one by one, and the statistical index is compared with the corresponding critical value to determine whether to select this feature to the corresponding feature pool. The critical value is a preset fixed value, which may be determined by the training model itself. The statistical index is, for example, a P value, an odds ratio, a correlation coefficient, a fold change, etc.

For example, FIG. 2 is a schematic diagram of the selection method for a single feature according to an embodiment of the disclosure. Only two training models Ms(1) and Ms(2) are shown in FIG. 2, but the disclosure is not limited thereto. Here, S training data sets TD1 to TDS are obtained based on a plurality of pieces of training data, and these training data sets TD1 to TDS are input into the training models Ms(1) to Ms(2) one by one to calculate a statistical index for a single feature. Hereinafter, the training data set TD1 using the training models Ms(1) to Ms(2) will be described as an example, and the same applies to the other training data sets TD2 to TDS. Statistical test is used for the training model Ms(1), and the corresponding P values p(f1) to p(fn) are calculated for the features f1 to fn by using the training model Ms(1). Then, the P values p(f1) to p(fn) are compared with the corresponding critical value T1, and it is set that the P value≤T1. It is assumed that the critical value T1=0.05. That is, the features with a P value less than or equal to 0.05 are selected to the corresponding feature pool Ps(1).

In addition, the training model Ms(2) is used to calculate the odds ratio. The corresponding odds ratios r(f1) to r(fn) are calculated for the features f1 to fn by using the training model Ms(2). Then, the odds ratios r(f1) to r(fn) are compared with the corresponding critical value T2, and it is set that the odds ratio>T2. It is assumed that the critical value T2=2. That is, the features with an odds ratio greater than 2 are selected to the corresponding feature pool Ps(2). In other embodiments, a third or more training models may be further added to calculate the statistical index of each feature, and compare it with the corresponding critical value to obtain a third or more feature pools.

Selection method (2): a feature extraction operation is performed on all the features through each training model to obtain a plurality of feature pools respectively corresponding to the training models. That is, a training model is used for training of a plurality of training data sets to obtain a group of features with the strongest correlation so as to obtain the feature pool corresponding to the training model.

Figure 3:
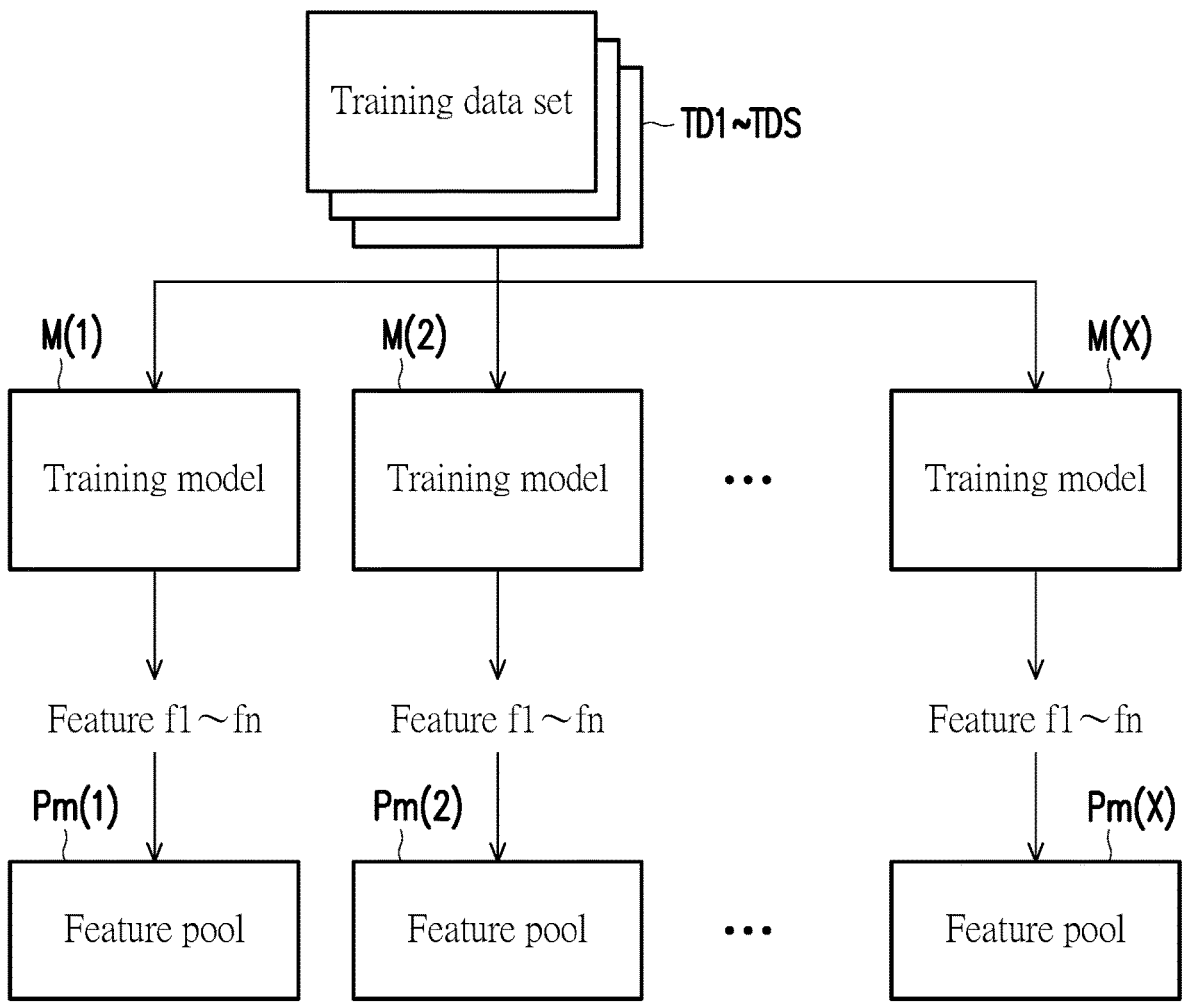
FIG. 3 is a schematic diagram of a selection method for all features according to an embodiment of the disclosure.

For example, FIG. 3 is a schematic diagram of the selection manner for all features according to an embodiment of the disclosure. In FIG. 3, X training models M(1) to M(X) are used. A plurality of training data sets TD1 to TDS are input into each of the training models M(1) to M(X) one by one for training so as to select the features with the strongest correlation. Hereinafter, the training data set TD1 using X training models M(1) to M(X) will be described as an example, and the same applies to other training data sets TD2 to TDS. The training model M(1) is used to select among all the features f1 to fn to obtain the feature pool Pm(1), and the training model M(2) is used to select among all the features f1 to fn to obtain the feature pool Pm(2), thereby obtaining X feature pools Pm(1) to Pm(X) accordingly.

In an embodiment, the specified number to be selected for the feature pools Pm(1) to Pm(X) may be determined according to the accuracy rates of the training models M(1) to M(X). For example, the specified amount is determined based on a steep slope map/elbow method. Taking the feature pool Pm(1) as an example, it includes S feature pools obtained by using the training model M(1) from the training data sets TD1 to TDS, and then the numbers of times that the features f1 to fn are selected by the S feature pools are ranked to obtain the specified number of features. The same applies to the feature pools Pm(2) to Pm(X).

Selection method (3): first all the features are classified into a plurality of feature groups based on a plurality of feature types, and then a feature extraction operation is performed on the features included in each feature group through each training model, so that one training model can obtain a plurality of feature pools corresponding to the plurality of feature groups. For example, in terms of omics features, omics features may be classified into feature types such as metabolomics and genomics, so multiple features may be classified into a metabolomics group, a genomics group, etc.

Figure 4:
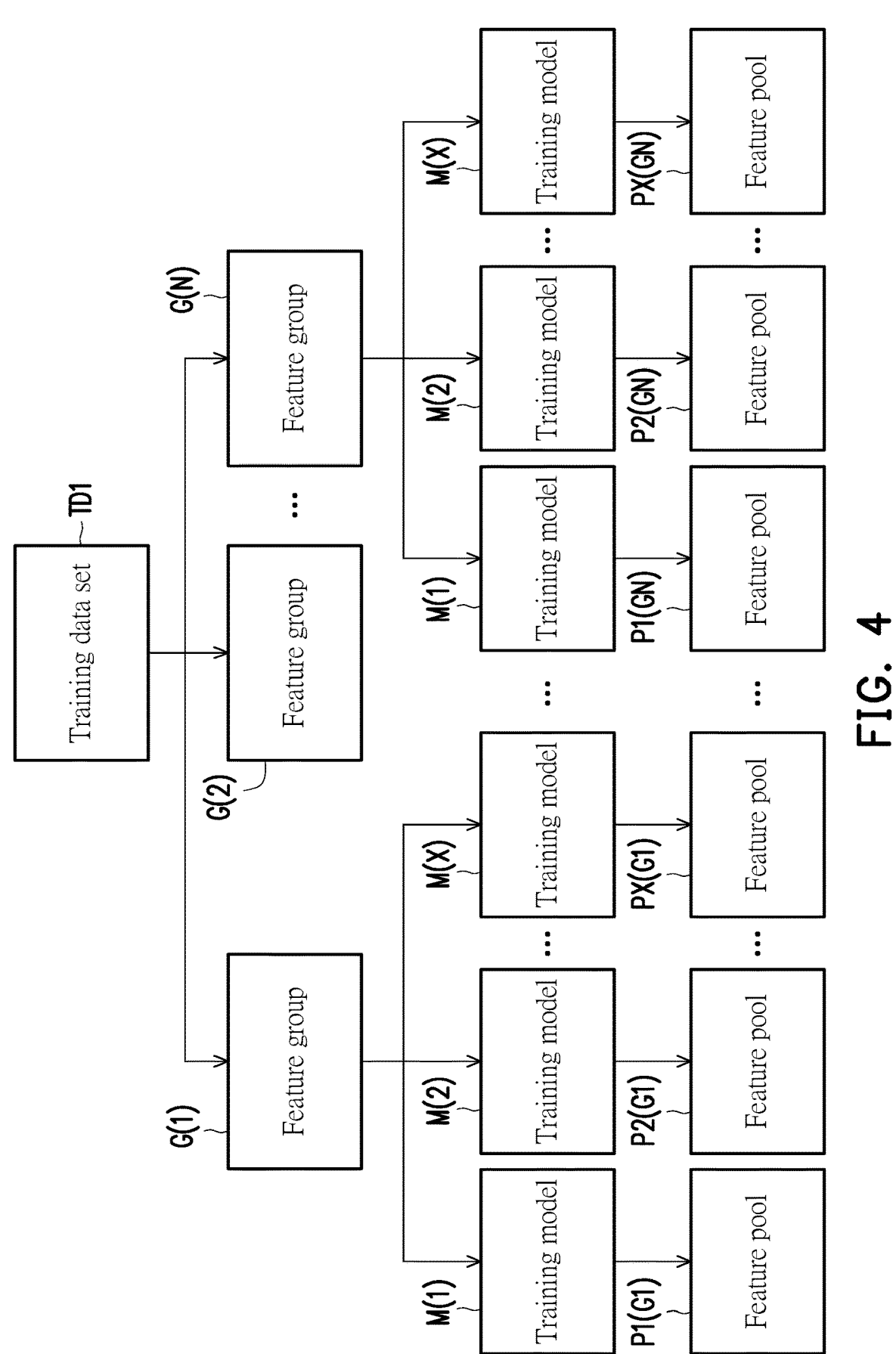
FIG. 4 is a schematic diagram of a selection method for feature groups according to an embodiment of the disclosure.

For example, FIG. 4 is a schematic diagram of the selection method for feature groups according to an embodiment of the disclosure. In this embodiment, X training models M(1) to M(X) used for one training data set TD1 will be described as an example, and the same applies to other training data sets TD2 to TDS. Furthermore, it is assumed that N feature groups G(1) to G(N) are obtained by classifying all the features based on N feature types.

Referring to FIG. 4, the training data set TD1 is input into each of the training models M(1) to M(X) for training for different feature groups. For the feature group G(1), the training data set TD1 is input into the training model M(1) for training and the training model M(1) is used to select among the feature group G(1) to obtain the feature pool P1(G1), the training data set TD1 is input into the training model M(2) for training and the training model M(2) is used to select among the feature group G(1) to obtain the feature pool P2(G1). The feature pools P1(G1), P2(G1), . . . , PX(G1) are obtained accordingly.

Next, for the feature groups G(2) to G(N), the training data set TD1 is respectively input into the training models M(1) to M(X) for training to obtain the corresponding feature pools. The result is shown in Table 1. The feature group G(1) corresponds to the feature pools P1(G1), P2(G1), . . . , PX(G1); the feature group G(2) corresponds to the feature pools P1(G2), P2(G2), . . . , PX(G2), and so on. The multiple feature pools corresponding to each feature group may be combined into large feature pools (TD1(G1) to TD1(GN)). For example, X feature pools P1(G1) to PX(G1) corresponding to the feature group G(1) may be combined into a large feature pool TD1(G1).

TABLE 1

| Feature group | Feature pool | Feature pool |
|---|---|---|
| G(1) | P1(G1), P2(G1), . . . , PX(G1) | TD1(G1) |
| G(2) | P1(G2), P2(G2), . . . , PX(G2) | TD1(G2) |
| . . . | . . . | . . . |
| G(N) | P1(GN), P2(GN), . . . , PX(GN) | TD1(GN) |

The training data sets TD2 to TDS are also trained for different feature groups, like the training data set TD1 shown in FIG. 4, to obtain large feature pools TD1(G1) to TDS (GN) corresponding to the feature groups G(1) to G(N), as shown in Table 2. For example, for the training data set TD2, the feature groups G(1) to G(N) respectively correspond to the large feature pools TD2(G1) to TD2(GN).

TABLE 2

| Training data set | Feature group G(1) | Feature group G(2) | . . . | Feature group G(N) |
|---|---|---|---|---|
| TD1 | TD1(G1) | TD1(G2) | . . . | TD1(GN) |
| TD2 | TD2(G1) | TD2(G2) | . . . | TD2(GN) |
| . . . | | | | |
| TDS | TDS(G1) | TDS(G2) | . . . | TDS(GN) |

Returning to FIG. 1, after the feature pool is obtained, in step S110, the features are sorted based on the number of times that each feature is selected by the feature pool to obtain a feature ranking. For example, if the feature f1 is selected by two feature pools, the count of the feature f1 is 2. Therefore, the count of each feature may be determined based on the features selected by each feature pool.

Then, in step S115, a plurality of designated features are extracted from the features based on the feature ranking. In an embodiment, designated features that meet a specified number may be extracted from the features.

Here, the specified number may be determined according to the accuracy rate of the training model. Specifically, a plurality of pieces of test data may be used to obtain a plurality of accuracy rates of each training model under the condition of selecting features of multiple different numbers. The test data is used to test the training model. The test data is used only when testing the training model to evaluate the accuracy rate of the training model. After obtaining the accuracy rates of each training model under the condition of selecting different numbers of features, one of the training models is selected based on these accuracy rates. For example, the training model with the highest accuracy rate is selected. Assuming that 10 different numbers of features are selected to test the accuracy rates of the training model, 10 accuracy rates are obtained for a training model. Then, X training models have 10X accuracy rates. The highest accuracy rate among the 10X accuracy rates is found so as to select the training model with the highest accuracy rate.

Figures 5, 6:
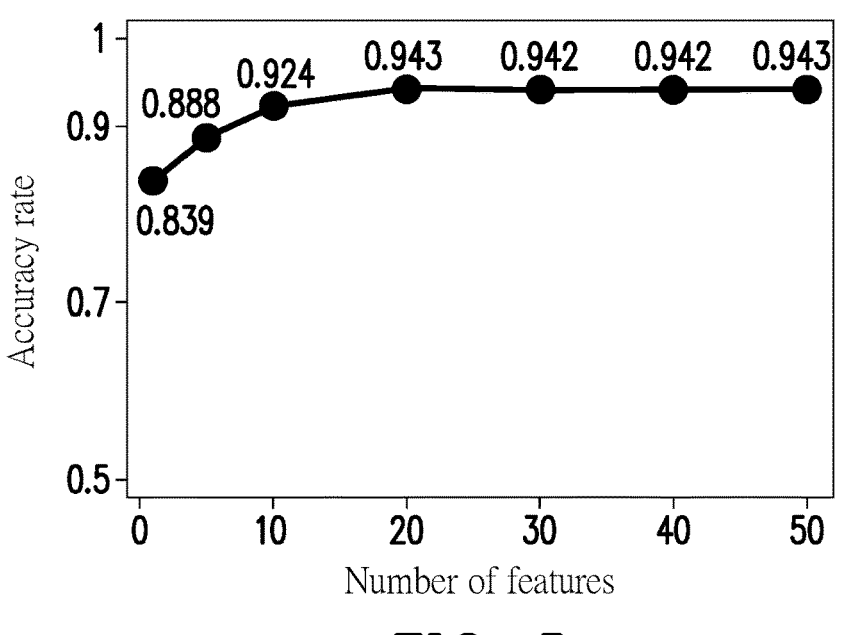
FIG. 5 is a schematic diagram of a steep slope map according to an embodiment of the disclosure.
FIG. 6 is a flowchart of a feature selection method according to an embodiment of the disclosure.

Next, a steep slope map/elbow method is obtained based on the number of the selected training models and the accuracy rates, as shown in FIG. 5. FIG. 5 is a schematic diagram of the steep slope map/elbow method according to an embodiment of the disclosure. Referring to FIG. 5, the horizontal axis represents the number of features, and the vertical axis represents the accuracy rate. In another embodiment, under different numbers of features, a receiver operating characteristic curve (ROC) is drawn according to a model prediction probability, and an area under curve (AUC) is calculated as the vertical axis. Then, the specified number is obtained from the numbers of features by the steep slope map/elbow method.

In the case where the selection method (3) is selected, a plurality of feature pools may be set as a feature set according to the feature groups, and then the features in each feature set are sorted based on the number of times that each feature is selected by the feature pool to obtain the feature ranking of each feature set. Taking FIG. 4 as an example, the S large feature pools respectively obtained from the training data sets TD1 to TDS corresponding to the feature group G(1) are set as the feature set TD(G1) (including TD1(G1) to TDS(G1)), and based on the feature set TD(G1), the features in the feature group G(1) are ranked to obtain a corresponding group of feature rankings R1. The S large feature pools respectively obtained from the training data sets TD1 to TDS corresponding to the feature group G(2) are set as the feature set TD(G2) (including the feature pools TD1(G2) to TDS(G2)), and based on the feature set TD(G2), the features in the feature group G(2) are ranked to obtain a corresponding group of feature rankings R2. Accordingly, N groups of feature rankings R1 to RN are obtained. Thereafter, based on the weight corresponding to each feature group and the feature ranking, a corresponding number of designated features are extracted from each feature group. For example, the weight corresponding to each feature group is based on the ratio of the number of features included in each feature group to the number of all features.

Assuming that the number of all features is n, there are three feature types, and the features can be classified into three feature groups, the numbers of features respectively included in the feature groups are n1, n2, and n3 (n=n1+n2+n3), and the corresponding weights are n1/n, n2/n, and n3/n, respectively. The specified number may be further multiplied by the corresponding weight so as to extract a corresponding number of designated features from each feature group.

FIG. 6 is a flowchart of a feature selection method according to an embodiment of the disclosure. Referring to FIG. 6, in step S605, at least one of the selection methods (1) to (3) is selected. For each selection method, the designated features that meet the corresponding specified number are obtained, and then a plurality of selected feature groups corresponding to the selection methods are obtained respectively. Assuming that the selection method (2) and the selection method (3) are selected, two selected feature groups {x1} and {x2} are obtained. The selected feature group is composed of a plurality of designated features extracted in step S115 of FIG. 1.

Next, in step S610, a union ({x1}∪{x2}), an intersection ({x1}∩{x2}), or a difference ({x1}−{x2} or {x2}−{x1}) of the selected feature groups {x1} and {x2} is obtained to obtain the integrated feature pool {x3}.

Then, in step S615, a plurality of known databases are queried through a multiomics feature regulation pathway analysis to select one or more representative features from the integrated feature pool {x3} so as to obtain another feature pool {x4}.

Figure 7:
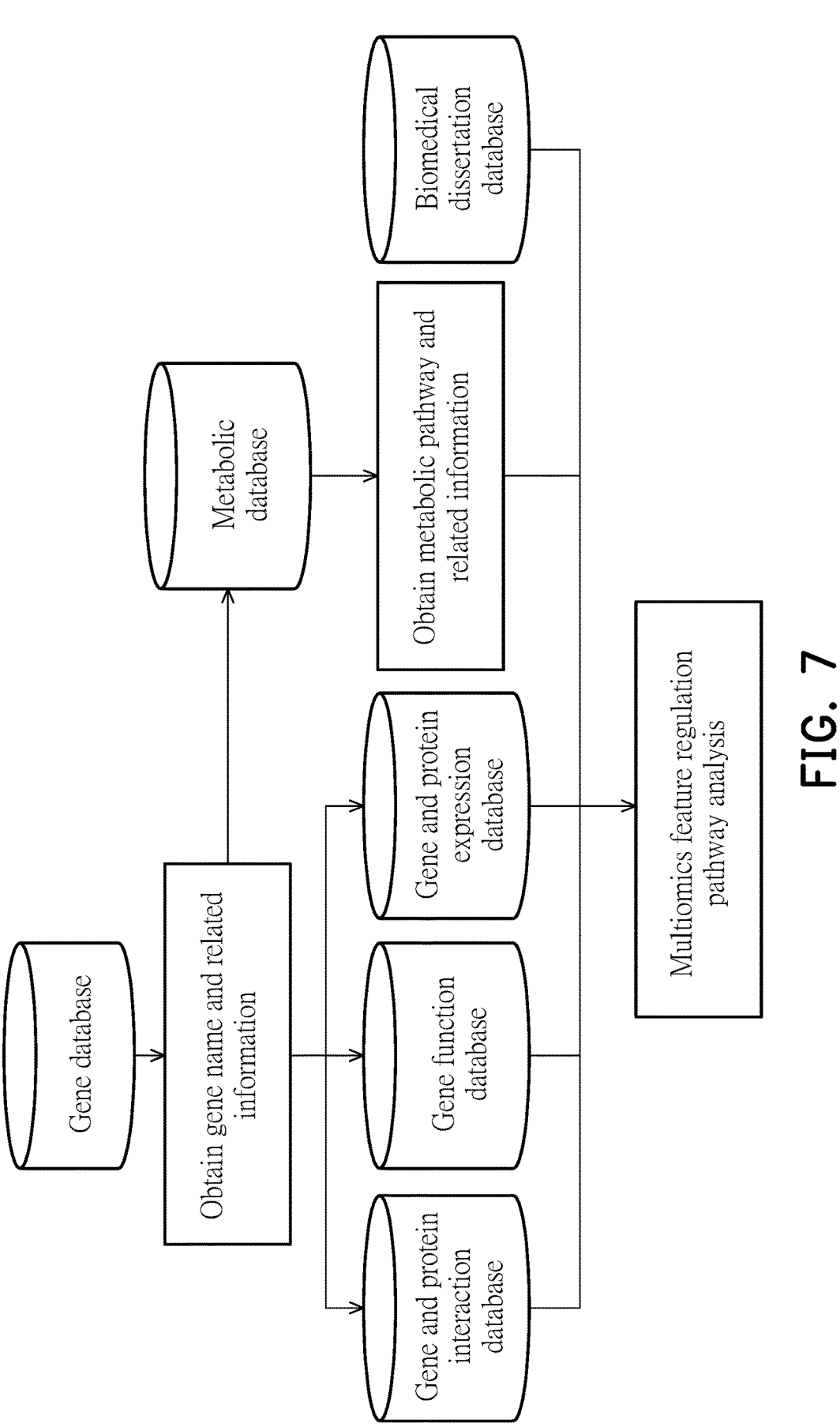
FIG. 7 is a schematic diagram of a multiomics feature regulation pathway analysis according to an embodiment of the disclosure.

FIG. 7 is a schematic diagram of the multiomics feature regulation pathway analysis according to an embodiment of the disclosure. The known databases used in this embodiment include: gene databases such as a series of databases related to biotechnology and biomedicine set up by the National Center for Biotechnology Information (NCBI); metabolic databases such as the MetaCyc database; gene and protein interaction databases such as BioGRID (Biological General Repository for Interaction Datasets); gene function databases such as the DAVID database; gene and protein expression databases such as the Human Protein Atlas; and biomedical dissertation databases such as the PubMed database. Of course, these are only examples, and the disclosure is not limited thereto.

Taking the two feature types, genomics and metabolomics, as an example, the gene database is queried to obtain the gene names and related information corresponding to the features classified into genomics; and the metabolic database is queried to obtain the metabolic pathways and related information corresponding to the features classified into metabolomics. Further, the gene and protein interaction database, the gene function database, and the gene and protein expression database are queried according to the obtained gene names so as to find the features appearing in the databases. Furthermore, the biomedical dissertation database is queried according to the gene names and metabolic pathways to obtain the features appearing in the biomedical dissertation database.

Then, the multiomics feature regulation pathway analysis is performed, that is, to find out what genes and metabolites are responsible for the physiological mechanism. Generally speaking, the physiological mechanism is that many genes interact with each other and cause a series of physical and chemical reactions and metabolites, and the metabolites in turn trigger other reactions. The multiomics feature regulation pathway analysis can find out what genes and metabolites cause the physiological mechanism. The multiomics feature regulation pathway analysis takes into account the genetic variation of organisms, and combines or concatenates multiomics features with known databases. Therefore, by applying the multiomics feature regulation pathway analysis to the features in the integrated feature pool {x3}, it is possible to find the feature pool {x4} that is clinically meaningful. The features in the feature pool {x4} are all related, for example, affecting each other.

Finally, in step S620, a final feature is selected from the representative features. That is, the predictive performance of the features in the feature pool {x4} for a disease is measured (for example, by the steep slope map/elbow method) to determine the final feature pool {x5} so as to ensure that the features in the feature pool {x5} are all clinically meaningful and have medically acceptable accuracy rates in disease prediction.

For example, a plurality of pieces of test data may be used to obtain a plurality of accuracy rates of each training model under the condition of respectively selecting different numbers of representative features in the feature pool {x4}. Then, one or more final features are selected from these representative features based on the accuracy rates. That is, after using the steep slope map/elbow method as described in FIG. 5 to obtain a number F, the final feature pool {x5} is selected from the feature pool {x4}, wherein the number of features in the feature pool {x5} is F, and then the top F features are selected according to the feature ranking obtained in FIG. 4 to obtain the feature pool {x5}.

In addition, in another embodiment, when the selection method (1) is selected, the ranking is not required, and the designated features are obtained directly. That is, at least one statistical index is calculated for a single feature through each training model one by one, and the statistical index is compared with the corresponding critical value so as to obtain the designated feature from the features. Taking FIG. 2 as an example, the features in the feature pools Ps(1) and Ps(2) are designated features.

Moreover, in other embodiments, if more than one selection method is selected and the selection method (1) (for a single feature) is included, the selection method (1) may be performed for a single feature first, and then the other selection methods may be performed on the feature pool selected by the selection method (1).

To sum up, the disclosure uses multiple training models to select features, and then performs the next selection according to the number of times that each feature is selected by the training model. Accordingly, the best prediction result can be obtained with the minimum number of features.

In addition, the disclosure provides three selection methods (1) to (3) to preliminarily select at least two selected feature groups {x1} and {x2}, select among the selected feature groups {x1} and {x2} obtained by preliminary selection to obtain the integrated feature pool {x3}, select the feature pool {x4} from the integrated feature pool {x3} through the multiomics feature regulation pathway analysis, and further select the feature pool {x5} from the feature pool {x4}. Accordingly, through the multi-level feature selection, the disclosure not only saves time in feature selection but also selects the most influential feature while maintaining high accuracy rates.

What is claimed is:

1. A feature selection method for constructing a classification model for predicting a disease state based on omics data, wherein an electronic device is used to perform following steps, comprising:
inputting a plurality of omics training data into a plurality of training models respectively to obtain a plurality of feature pools corresponding to the plurality of training models respectively, wherein obtaining the feature pools comprises:
inputting the omics training data into each of the training models to obtain a plurality of omics features;
classifying the omics features into a plurality of feature groups based on a plurality of feature types, so that each of the training models performs a feature extraction operation on the omics features included in each of the feature groups to obtain, for each of the training models, a plurality of first feature pools respectively corresponding to the feature groups, wherein the feature pools comprises the first feature pools;
setting the feature pools corresponding to each of the feature groups as a feature set;
sorting the omics features in each feature set based on a number of times that each of the omics features is selected by the feature pools to obtain a feature ranking of each feature set;
extracting a corresponding number of a plurality of designated features from each feature set based on a weight corresponding to each of the feature groups and the feature ranking, wherein the weight corresponding to each of the feature groups is based on a ratio of the number of omics features included in each of the feature groups to the number of all omics features; and
inputting the plurality of designated features into the classification model and using a learning algorithm to continuously adjust internal parameters of the classification model through iteration, wherein the classification model is a neural network.

2. The feature selection method according to claim 1, wherein obtaining the feature pools further comprises:
after obtaining the omics features, calculating a statistical index for each of the omics features through each of the training models; and comparing the statistical index with a corresponding critical value to determine whether to select each of the omics features to a corresponding second feature pool, wherein the plurality of feature pools further comprises; and
after obtaining the omics features, performing the feature extraction operation on the omics features through each of the training models to obtain a plurality of third feature pools respectively corresponding to the training models;
wherein the plurality of feature pools further comprises a plurality of second feature pools respectively corresponding to the training models and the third feature pools,
wherein extracting the plurality of designated features from the omics features based on the feature ranking comprises:
obtaining the designated features that meet a corresponding specified number to obtain a first selected feature group, a second selected feature group and a third selected feature group corresponding to the first feature pools, the second feature pools and the third feature pools, respectively.

3. The feature selection method according to claim 2, wherein after obtaining the first selected feature group, the second selected feature group and the third selected feature group, the feature selection method further comprises:
executing one of a union, an intersection, and a difference on the first selected feature group, the second selected feature group and the third selected feature group to obtain an integrated feature pool.

4. The feature selection method according to claim 3, wherein after obtaining the integrated feature pool, the feature selection method further comprises:

querying a plurality of known databases to select a plurality of representative omics features that are related to a physiological mechanism in the integrated feature pool, wherein the physiological mechanism is that genes interact with each other and cause a series of physical and chemical reactions and metabolites.

5. The feature selection method according to claim 4, wherein after obtaining the one or more representative omics features, the feature selection method further comprises:

using a plurality of pieces of test data to obtain a plurality of accuracy rates of each of the training models under a condition of respectively selecting the representative omics features of a plurality of different feature numbers; and selecting one or more final omics features from the representative omics features based on the accuracy rates.

6. The feature selection method according to claim 1, wherein extracting the designated features from the omics features based on the feature ranking comprises:

extracting the designated features that meet a specified number from the omics features based on the feature ranking, wherein after obtaining the feature pools, the feature selection method further comprises:

using a plurality of pieces of test data to obtain a plurality of accuracy rates of each of the training models under a condition of selecting omics features of a plurality of different feature numbers;

selecting one of the training models based on the accuracy rates;

obtaining a steep slope map based on the feature numbers and the accuracy rates of the selected one of the training models; and obtaining the specified number from the feature numbers based on the steep slope map.

7. The feature selection method according to claim 1, wherein after obtaining the designated features, the feature selection method further comprises:

querying a plurality of known databases to select a plurality of representative omics features that are related to a physiological mechanism from the designated features, wherein the physiological mechanism is that genes interact with each other and cause a series of physical and chemical reactions and metabolites.

8. The feature selection method according to claim 7, wherein after obtaining the representative features, the feature selection method further comprises:

using a plurality of pieces of test data to obtain a plurality of accuracy rates of each of the training models under a condition of respectively selecting the representative omics features of a plurality of different feature numbers; and selecting one or more final omics features from the representative omics features based on the accuracy rates.

* * * * *